(12) United States Patent
Vezzoli

(10) Patent No.: US 10,928,908 B2
(45) Date of Patent: Feb. 23, 2021

(54) HAPTIC DEVICE, FOR INTERACTION WITH VIRTUAL REALITY OR AUGMENTED REALITY SYSTEMS

(71) Applicant: GO TOUCH VR SAS, Lille (FR)

(72) Inventor: Eric Vezzoli, Paris (FR)

(73) Assignee: GO TOUCH VR SAS, Lille (FR)

( * ) Notice: Subject to any disclaimer, the term of this patent is extended or adjusted under 35 U.S.C. 154(b) by 0 days.

(21) Appl. No.: 16/337,012

(22) PCT Filed: Sep. 29, 2017

(86) PCT No.: PCT/EP2017/001156
§ 371 (c)(1),
(2) Date: Mar. 27, 2019

(87) PCT Pub. No.: WO2018/059737
PCT Pub. Date: Apr. 5, 2018

(65) Prior Publication Data
US 2019/0227633 A1    Jul. 25, 2019

(30) Foreign Application Priority Data
Sep. 29, 2016  (IT) .......................... 10201600097954

(51) Int. Cl.
*G06F 3/01*       (2006.01)
*G06F 3/0362*   (2013.01)
(Continued)

(52) U.S. Cl.
CPC .............. *G06F 3/016* (2013.01); *G06F 3/011* (2013.01); *G06F 3/014* (2013.01); *G06F 3/017* (2013.01);
(Continued)

(58) Field of Classification Search
CPC ................................ G06F 3/014; G06F 3/016
See application file for complete search history.

(56) References Cited

U.S. PATENT DOCUMENTS 10,509,468 B2 * 12/2019 Kuchenbecker ...... G06F 3/0346
2009/0153365 A1     6/2009 Salsedo et al.
(Continued)

FOREIGN PATENT DOCUMENTS

GB            2499019            8/2013

OTHER PUBLICATIONS

Partap S. Khalsa; Robert M. Friedman; Mandayam A. Srinivasan; Robert H. Lamotte, "Encoding of Shape and Orientation of Objects Indented Into the Monkey Fingerpad by Populations of Slowly and Rapidly Adapting Mechanoreceptors", Journal of Neurophysiology, pp. 3238-3251, URL: http://jn.physiology.org/content/79/6/3238.
(Continued)

*Primary Examiner* — Gene W Lee
(74) *Attorney, Agent, or Firm* — Duane Morris LLP; Gregory M. Lefkowitz

(57) ABSTRACT

A haptic device, for interaction with virtual reality or augmented reality systems, including a fixed body configured to be worn on a finger of the hand, and a movable body associated with the fixed body and actuated by a motor means; the device includes a flap associated with the movable body and having a convex contact surface; the movable body being movable with respect to the fixed body so that the contact surface moves from a position that is spaced from the fingertip to a position of contact with the fingertip.

16 Claims, 5 Drawing Sheets

(51) Int. Cl.
  *G06F 3/03* (2006.01)
  *G06F 3/0346* (2013.01)

(52) U.S. Cl.
  CPC .......... *G06F 3/0304* (2013.01); *G06F 3/0346* (2013.01); *G06F 3/0362* (2013.01)

(56) References Cited

U.S. PATENT DOCUMENTS

2016/0246370 A1 8/2016 Osman
2016/0259417 A1 9/2016 Gu
2017/0368452 A1* 12/2017 Tiffany .................. A63F 13/22

OTHER PUBLICATIONS

Kenneth O. Johnson, "The roles and functions of cutaneous mechanoreceptors", Elsevier, Current Opinion in Neurobiology, vol. 11, Issue 4, Aug. 1, 2001, pp. 455-461, ISSN 0959-4388, https://doi.org/10.1016/S0959-4388(00)00234-8. (https://www.sciencedirect.com/science/article/abs/pii/S0959438800002348).
Wouter M. Bergmann Tiest, Tactual perception of material properties Elsevier,Vision Research, vol. 50, Issue 24, Dec. 2010, pp. 2775-2782) https://www.sciencedirect.com/science/article/pii/S0042698910004967?via%3Dihub.
A. Bicchi; E.P. Scilingo; D. De Rossi, Haptic discrimination of softness in teleoperation: the role of the contact area spread rate, IEEE Transactions on Robotics and Automation ( vol. 16 , Issue: 5 , Oct. 2000) doi: 10.1109/70.880800, http://ieeexplore.ieee.org/stamp/stamp.jsp?tp=&arnumber=880800&isnumber=19052.

* cited by examiner

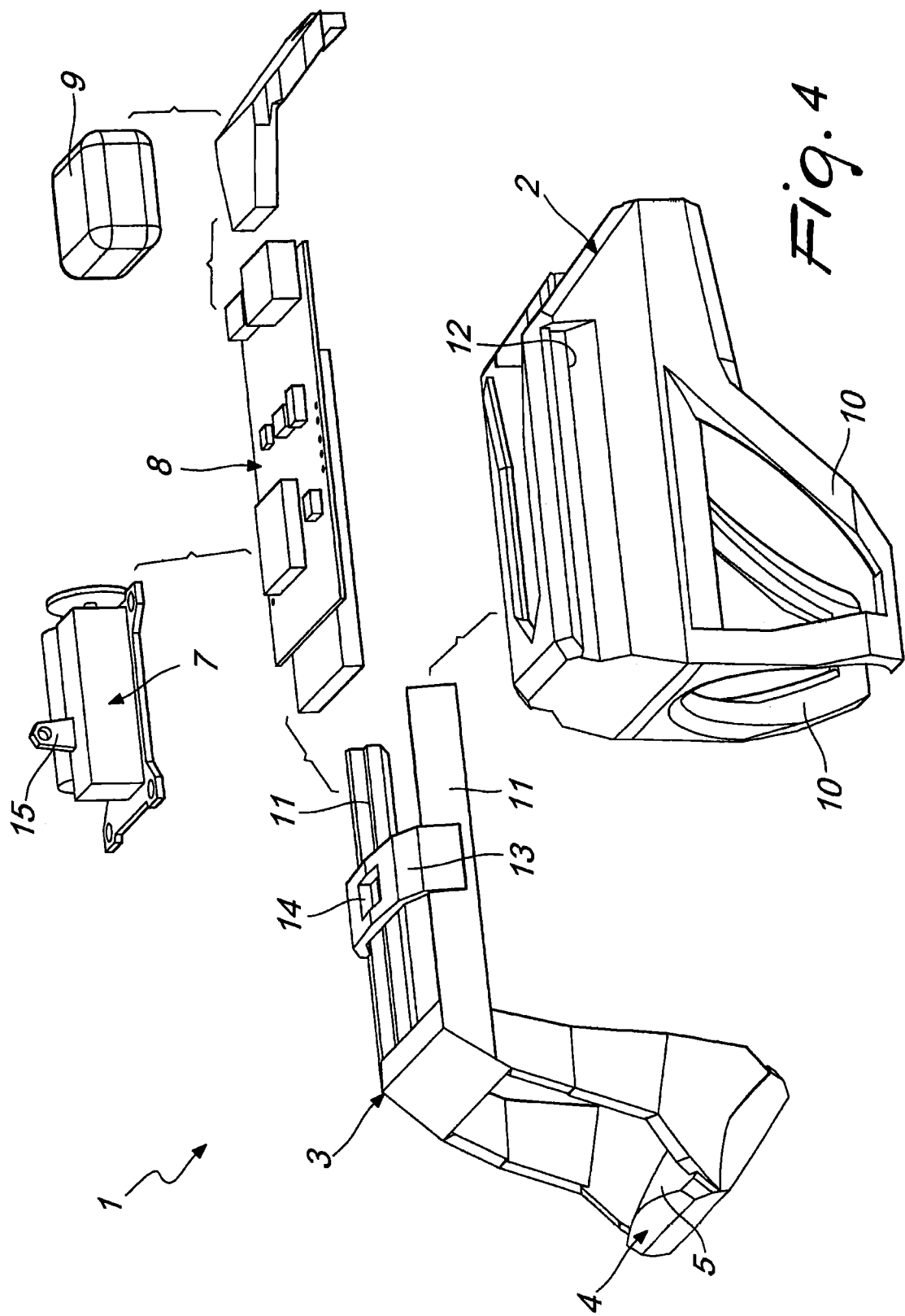

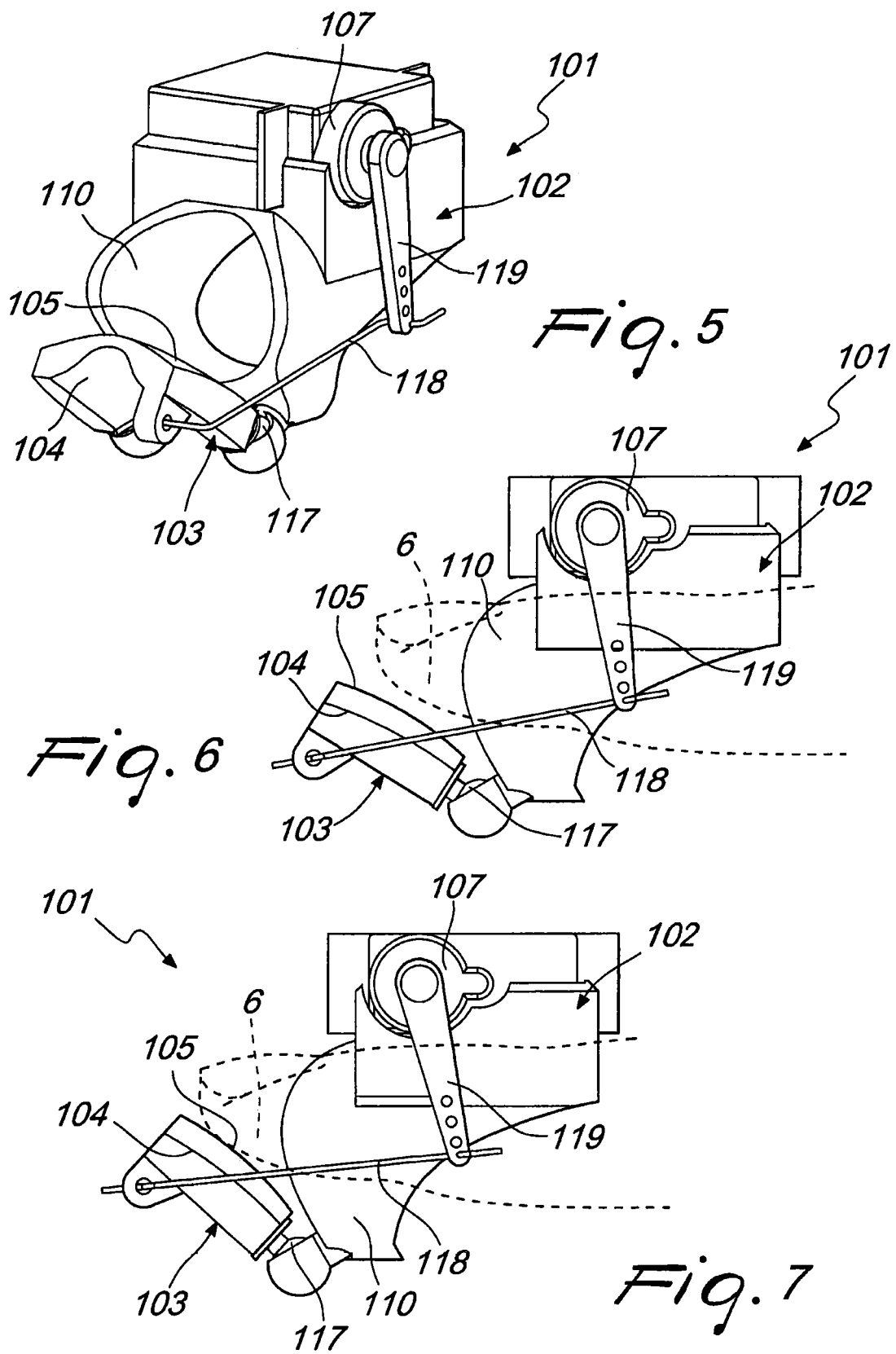

HAPTIC DEVICE, FOR INTERACTION WITH VIRTUAL REALITY OR AUGMENTED REALITY SYSTEMS

CROSS-REFERENCE TO RELATED APPLICATIONS

This application is a § 371 national stage entry of International Application No. PCT/EP2017/001156, filed Sep. 29, 2017, which claims priority to Italian Application No. 10 2016 0009 7954, filed Sep. 29, 2016, the entire contents of which are incorporated herein by reference.

The present invention relates to a haptic device, for interaction with virtual reality or augmented reality systems.

Currently, users of virtual reality systems interact with virtual environment by means of control devices, such as joysticks and the like, or peripherals that provide basic hand function, with the help of buttons.

In the absence of tactile feedback, user experience is limited to the visual feedback provided by the head mounted display.

In this case the user can see a virtual representation of his hand/finger, but is aware of interactions with the virtual environment only through the graphic variations or changes in the appearance of objects.

The main disadvantage of this system resides in that the user can rely only on visual feedback, and this only provides a scarcely realistic experience.

If the peripheral is capable of providing a tactile feedback, the user can both see a virtual representation of his hand/finger and obtain a mechanical/tactile feedback when there is contact with the virtual object. This solution improves the user experience significantly.

Various wearable devices capable of providing tactile feedback have been known for a few years.

US 2016/0246370 discloses a device of the type shaped like a normal glove and in which tactile feedback is provided by a vibration applied to the tips of the fingertips of the user.

Another type of haptic system is constituted by wearable devices which are shaped so as to surround the user's hand finger like a thimble or ring.

Haptic devices of such type for use in virtual reality are currently not commercially known.

GB2499019A discloses a haptic device for use in virtual reality systems; the device has a presser which acts on the lower part of a finger.

Prior art devices have some limitations and problems in use with virtual reality systems.

Known devices are limited in performance as regards capabilities of tracking the spatial position of the hand/finger and gesture recognition.

Also the conventional haptic devices must be specially adapted to the system for tracking hand motions of the virtual reality appliance to which they are applied.

Another drawback of the prior art devices is due to their mechanisms, especially as regards devices of the vibrotactile type offering a limited tactile sensation and poor touch realism.

WO2006/054163 discloses a portable interface haptic device wherein the tactile sensations are transmitted to a fingertip through a movable and orientable surface contacting the fingertip. The haptic device transmits tactile sensations on the user's hand fingertips following the shape of a virtual surface, obtained from a real surface. The movable and orientable surface is flat and must remain tangential to the virtual surface.

The aim of the present invention is to provide a haptic device, particularly for interaction with virtual reality or augmented reality systems, that overcomes the drawbacks of the cited prior art.

Within the scope of this aim, an object of the invention is to provide a device that is capable of supplying useful data to spatial tracking and gesture recognition systems.

Another object of the invention is to provide a device that has a simple mechanism and at the same time is more effective than the mechanisms of the prior art devices.

An important object of the present invention is to provide a device that ensures a more realistic tactile sensation than the prior art haptic devices.

A further object of the invention is to provide a compact device which can be used with any spatial hand tracking system without having to modify the system to adapt it to the presence of the device, as is instead necessary for haptic devices of the prior art.

This aim and these and other objects which will become better apparent hereinafter are achieved by a haptic device, for interaction with virtual reality or augmented reality systems, comprising a fixed body configured to be worn on a finger of the hand, and a movable body associated with said fixed body and actuated by a motor means; a flap associated with said movable body and having a contact surface; said movable body being movable with respect to said fixed body so that said contact surface moves from a position that is spaced from said fingertip to a position of contact with the fingertip; said device being characterized in that said contact surface of said flap is convex.

Further characteristics and advantages will become better apparent from the description of preferred but not exclusive embodiments of the invention, illustrated by way of non-limiting example in the accompanying drawings, wherein:

FIG. 4 is an exploded perspective view of the device of the preceding figures;

FIG. 5 is a perspective view of a second embodiment of the haptic device according to the present invention;

FIG. 6 is a lateral elevation view showing the device of the preceding figure worn on a finger, in the condition in which the movable flap does not touch the fingertip;

FIG. 7 is a view, similar to the preceding one, showing the condition in which the movable flap touches the fingertip;

Figure 1:
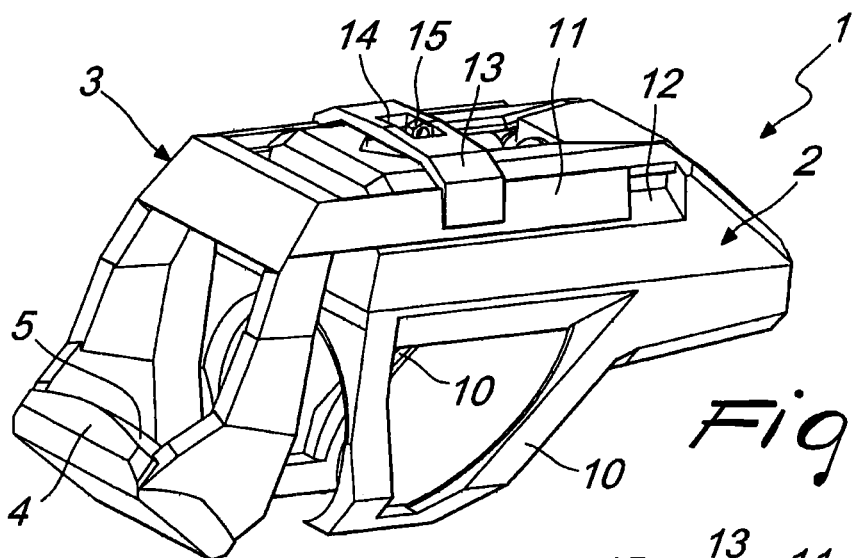
FIG. 1 is a perspective view of a first embodiment of the haptic device according to the present invention.
Figure 11:
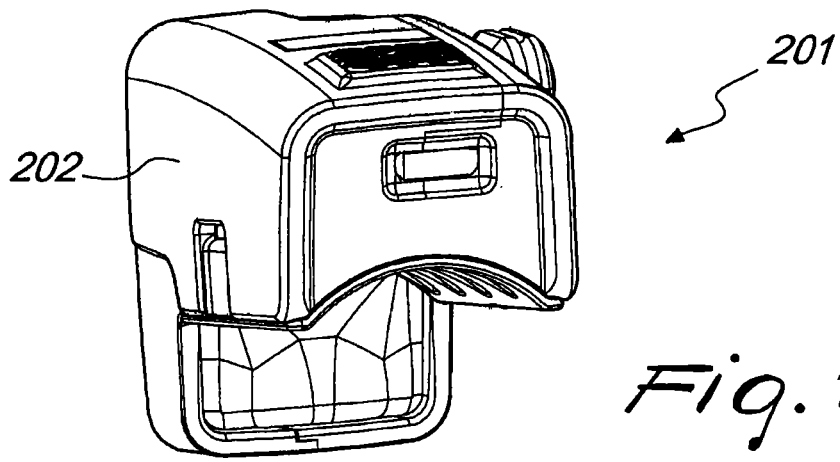
Figure 12:
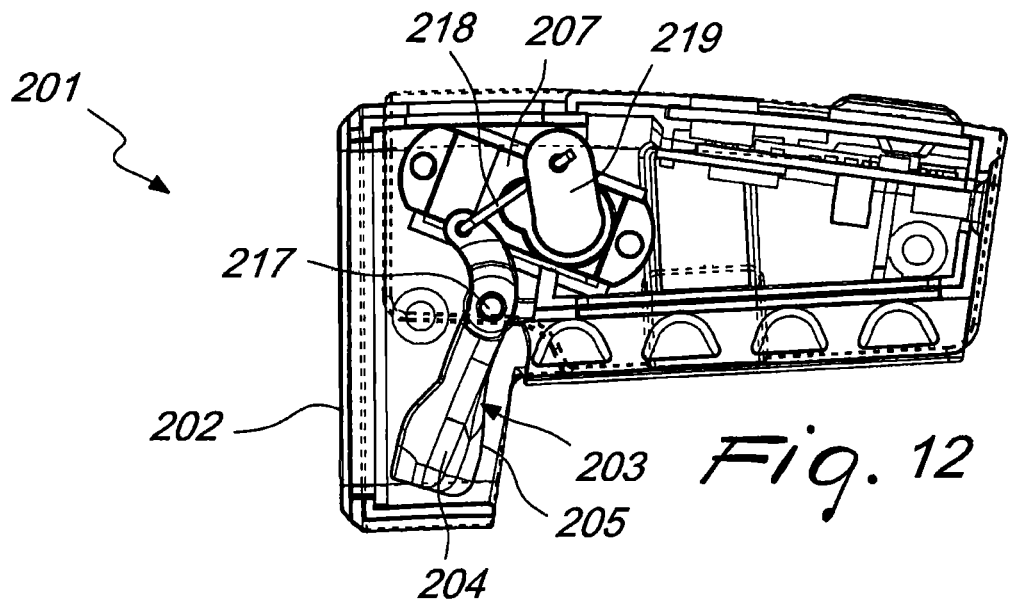
Figure 13:
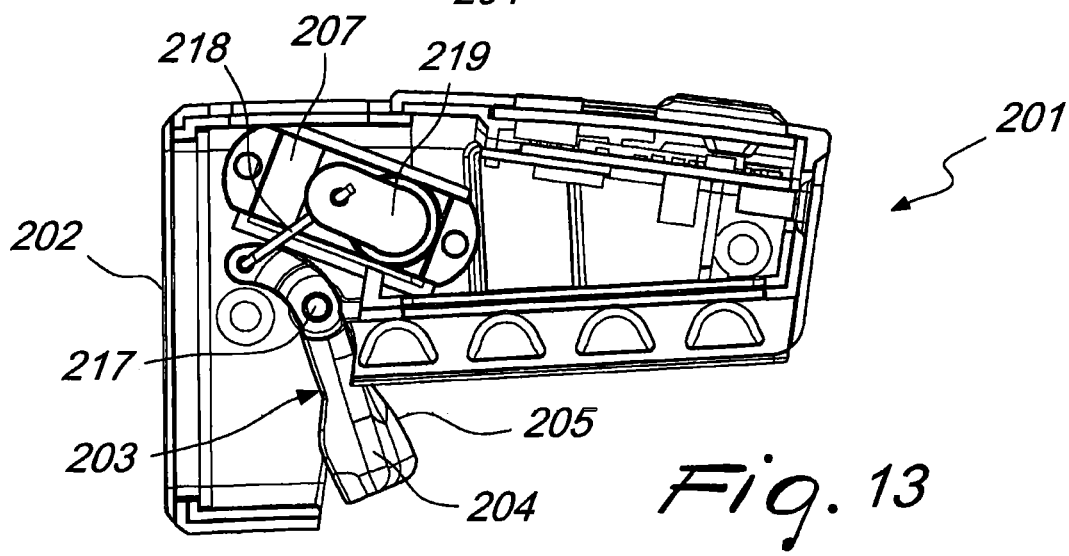

With reference to the cited figures, the device according to the invention, globally designated by the reference numeral 1, has a fixed body 2 which is adapted to be worn on a hand finger at the medial and distal phalanges;

FIG. 11 is a perspective view of a further embodiment of the haptic device according to the present invention;

FIG. 12 is a side view of the device of the preceding figure, shown in the condition in which the movable flap does not touch the fingertip;

FIG. 13 is a view, similar to the preceding one, showing the condition in which the movable flap touches the fingertip.

A movable body 3 is associated with the fixed body 2 and has a flap 4 which is provided with a contact surface 5.

Figure 2:
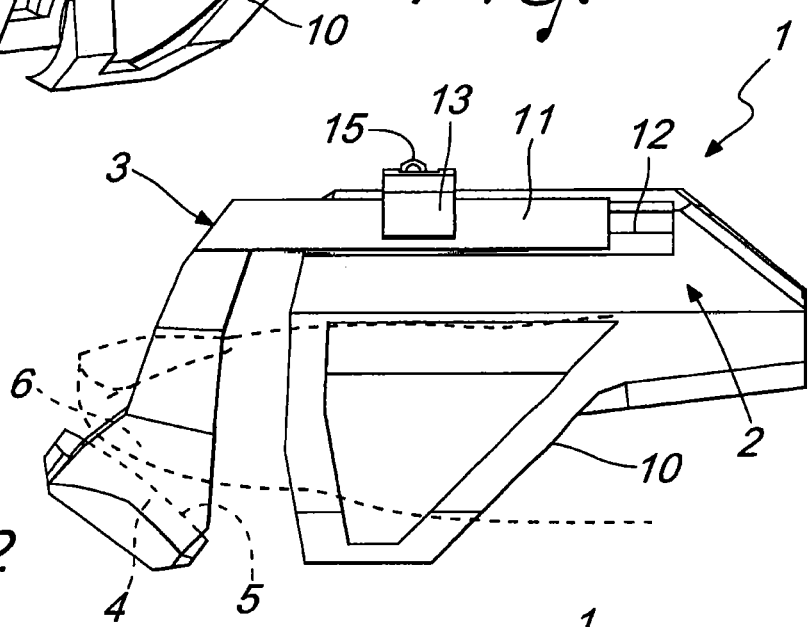
FIG. 2 is a side view of the device of the preceding figure worn on a finger, in the condition in which the movable flap does not touch the fingertip.
Figure 3:
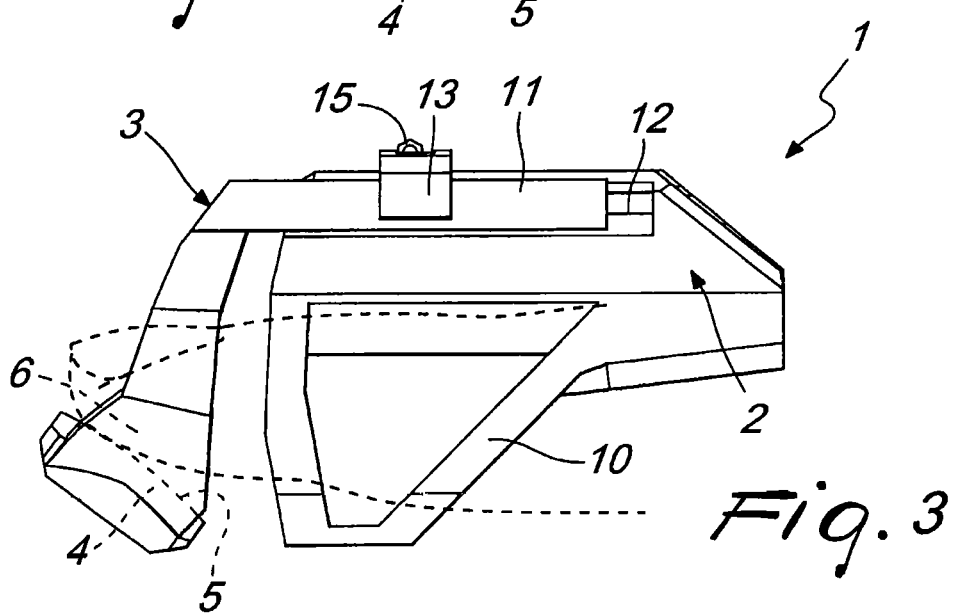
FIG. 3 is a view, similar to the preceding one, showing the condition in which the movable flap touches the fingertip.

The movable body 3 is movable with respect to the fixed body 2 so that the contact surface 5 of the flap 4 moves from a position that is spaced from the fingertip 6, visible in FIG. 2, to a position of contact with the tip, visible in FIG. 3.

The movement of the movable body 3 is performed by a motor 7 that is mounted on the fixed body 2.

The motor 7 is an electric or piezoelectric motor.

The fixed body 2 comprises a control circuit 8 which includes a wireless data transmission module, preferably a Bluetooth® module, and an accelerometer, as well as a battery 9 for supplying power to the device.

The fixed body 2 is provided with a means for locking the fixed body 2 to the finger, constituted in the specific case by a pair of curved brackets 10 adapted to wrap around the finger.

The movable body 3 can slide with respect to the fixed body 2 by means of a pair of longitudinal bars 11, which are formed in the movable body 3 and are adapted to engage corresponding lateral guides 12 formed in the fixed body 2.

The movable body 3 is also provided with a cross member 13 which has a seat 14 accommodating a protrusion 15 of the linear motor 7 for moving the movable body 3.

The movement of the protrusion 15 of the linear motor 7 causes the movable body 3 to slide longitudinally with respect to the fixed body 2.

The contact surface 5 of the flap 4 is curved, namely convex, with respect to the fingertip 6.

FIGS. 5-7 are views of a further embodiment of the device according to the invention, globally designated by the reference numeral 101, which includes a fixed body 102 adapted to be worn on a hand finger at the medial and distal phalanges.

A movable body 103 is associated with the fixed body 102 and includes a flap 104 provided with a contact surface 105.

The movable body 103 can move with respect to the fixed body 102 so that the contact surface 105 of the flap 104 moves from a position that is spaced from the fingertip 6, which is visible in FIG. 6, to a position of contact with the tip, visible in FIG. 7.

The movement of the movable body 103 is performed by a motor 107 that is mounted on the fixed body 102.

The movable body 103 is hinged to the fixed body 102 in a hinge 117 and is actuated by a linkage 118 whose ends are connected respectively to the movable body 103 and to a crank 119 which is connected to the shaft of the rotary motor 107.

The fixed body 102 is provided with a means for locking the fixed body 102 to the finger, which in the specific case is constituted by an annular portion 110 that is adapted to wrap around the finger.

The contact surface 105 of the flap 104 is curved, namely convex with respect to the fingertip 6.

The fixed body 2, 102 allows to wear the device like a ring or thimble and is in contact with the upper part of the finger.

The fixed body 2, 102 is rigid and the locking means 10, 110 allows the user to wear the device on a finger, just like a normal ring or thimble.

The flap 4, 104 can move with respect to the fixed body 2, 102 by means of the movable body 3, which can slide with respect to the fixed body 2, or by means of the movable body 103, which is pivoted to the fixed body 102.

FIGS. 11-13 are views of a further embodiment of the device according to the invention, globally designated by the reference numeral 201, which includes a fixed body 202 adapted to be worn on a hand finger at the medial and distal phalanges.

A movable body 203 is associated with the fixed body 202 and includes a flap 204 provided with a contact surface 205.

The movable body 203 can move with respect to the fixed body 202 so that the contact surface 205 of the flap 204 moves from a position that is spaced from the fingertip, which is visible in FIG. 12, to a position of contact with the tip, visible in FIG. 13.

The movement of the movable body 203 is performed by a motor 207 that is mounted on the fixed body 202.

The movable body 203 is hinged to the fixed body 202 in a hinge 217 and is actuated by a linkage 218 whose ends are connected respectively to the movable body 203 and to a crank 219 which is connected to the shaft of the rotary motor 207.

The fixed body 202 is provided with a means for locking the fixed body 202 to the finger.

The contact surface 205 of the flap 204 is curved, namely convex with respect to the fingertip.

The fixed body 2, 102, 202 allows to wear the device like a ring or thimble and is in contact with the upper part of the finger.

The fixed body 2, 102, 202 is rigid and the locking means 10, 110 allows the user to wear the device on a finger, just like a normal ring or thimble.

The flap 4, 104, 204 can move with respect to the fixed body 2, 102, 202 by means of the movable body 3, which can slide with respect to the fixed body 2, or by means of the movable body 103, 203 which is pivoted to the fixed body 102, 202.

The control circuit, mounted in the fixed body 2, 102, 202 controls the linear motor 7 or rotary motor 107, 207.

The control circuit, mounted in the fixed body 2, 102, 202 controls the linear motor 7 or rotary motor 107, 207.

The Bluetooth® module, together with the battery, allows wireless operation of the device.

The linear motor 7 actuates the movable flap 4 directly, by making the movable body 3 slide. The rotary motor 107, 207 actuates the movable flap 104, 204 rotating the movable body 103, 203 by means of the linkage 118, 218. In both cases the motor is capable of transferring both a pulling force and a pushing force to the movable flap.

Tracking of the device can be performed by external hand tracking systems, which recognize the shape of the hand, such as for example a "LEAP Motion" device, or by means of optical tracking based on infrared reflection (HTC), or by means of the accelerometer that is integrated in the control circuit, or also by optical tracking of an LED mounted on the fixed body.

Control of the device is performed by the control circuit mounted in the fixed body, which synthesizes the haptic signals that the device must provide; in other words, it adjusts the movement of the flap 4, 104, 204 with respect to the fingertip 6.

The device according to the present invention is a wearable remote control device with tactile feedback, particularly studied for interaction with personal computers (PC) so as to provide a tactile feedback that allows interaction with virtual reality or augmented reality environments.

The device according to the present invention is fully wireless and can be used both for interaction with virtual reality and augmented reality environments and in standard two-dimensional (2D) standard environments of desktop PCs.

In particular, the device according to the present invention allows the user to point, touch, push, grip or slide on any virtual graphical object that is reproduced by means of software.

The device can be worn by the user like a thimble or ring on one or more fingers and allows simultaneous use of multiple devices.

The present device is completely wireless and can be connected to a PC by means of a normal Bluetooth® connection. It is possible to connect multiple devices, i.e., one device for each finger of the hand of a user, or multiple devices for the interaction of multiple users simultaneously.

The Bluetooth® connection allows the exchange of all the data between the device and the PC and the power supply is ensured by the battery that is installed on the fixed body.

The accelerometer mounted in the fixed body provides data to the control circuit that performs the required calculations, for example for gesture recognition and for spatial tracking of the hand/finger.

The data gathered by the accelerometer can be exchanged with the software of the PC, by means of the Bluetooth® link, for further processing on the part of the PC.

The device according to the present invention is capable of operating in combination with internal or external hand tracking systems manufactured by third parties.

The present device, used with a PC, can be used by the user with the same function of an ordinary mouse but with the additional characteristic of haptic interaction.

Used in combination with a PC equipped with virtual reality or augmented reality systems, the present device allows the user to experience the illusion of touching an actual three-dimensional object, or any other virtual element, when the virtual finger or fingers make contact with a virtual object. The illusion is provided by providing a tactile sensation directly on the fingertip by means of the convex contact surface 5, 105.

The convex surface 5, 105, during use, is not constantly in contact with the fingertip of the user and contact occurs only when necessary in order to reproduce a contact with a virtual object.

Tactile feedback is mainly of a mechanical type and is provided by the motor that pushes the convex contact surface 5, 105, 205 up to the fingertip.

The tactile illusion of touching the object is realistic, because the convex contact surface 5, 105, 205 allows to modify the contact area on the finger 6 and the contact force is perceived by the user as a feedback force, in an interval included between zero and 1.5 N.

The movement force of the motor is controlled in real time by means of the PC together with the control circuit of the device.

The extent and characteristics of the tactile feedback can be completely customized by means of the software in order to adapt the user experience to the specific virtual scene.

In practice it has been found that the invention achieves the intended aim and objects, a haptic device, particularly studied for interaction with virtual reality or augmented reality systems, having been provided which offers substantial functional advantages with respect to prior art devices.

The technical solutions adopted in the device according to the present invention distinguish it from all known prior art devices.

An important advantage of the present invention is constituted by the presence of the integrated accelerometer and by the computational capabilities of the control circuit, which allows to process the data gathered by the accelerometer in real time in order to allow both spatial tracking and gesture recognition.

Another advantage is provided by the mechanical system, which allows to move the contact flap directly by means of the motor, differently from most systems of the known type which are based essentially on vibrotactile systems.

When the contact surface of the flap is convex, this convex surface allows modulation of the contact area on the fingertip, from a point-like area up to the complete area of the fingertip, depending on the distance covered by the flap. This convex contact surface always has a greater displacement/area ratio than a planar surface.

Also, the curved convex surface increases the tactile illusion, making the sensation of touch more realistic, as explained in the following paragraphs.

The convex surface of contact allows to avoid the necessity to position the surface of contact parallel to the virtual surface to reproduce during the generation of the contact. This effect is based on the human perception of the orientation of the surface based on the direction of the normal force. The convex surface provides the user with a field of normal forces without a defined geometry. This allows the brain experiencing the visual input and expecting the contact in one direction to be satisfied by the generic field of normal forces under the fingertip [Trajectory of contact region on the finger pad gives the illusion of haptic shape—Dostmohamed H1, Hayward V.—DOI: 10.1007/s00221-005-2262-5].

Figure 8:
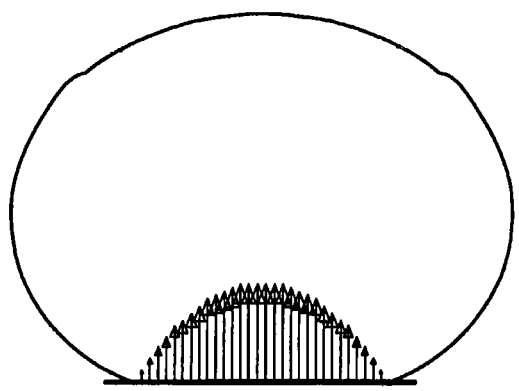
FIG. 8 shows the contact pressure distribution, in finger pad cross section, of a flat surface, according to the prior art.
Figure 9:
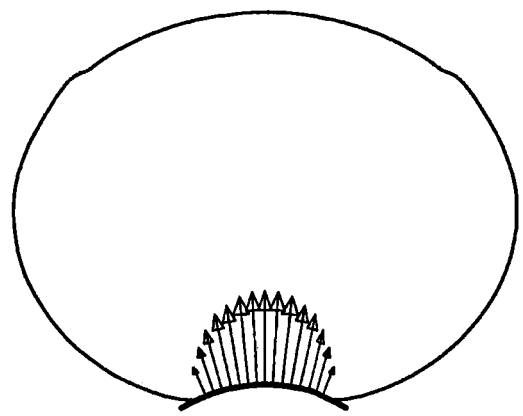
FIG. 9 shows the contact pressure distribution, in finger pad cross section, of a convex surface of contact, according to the present invention.

FIG. 8 shows the contact pressure distribution, in finger pad cross section, of a flat surface, according to the prior art; while FIG. 9 shows the contact pressure distribution of a convex surface of contact, according to the present invention.

The convex surface grants the stress/strain concentration closer to the epidermis, i.e. the skin layer with the greatest concentration of type 1 mechanoreceptors RA1 (Meisner) and SA1 (Merkel), which play a major role in tactile perception of edges and surface shapes. This aspect enhances the capability of the system to provide perceivable tactile sensation for a given force [Encoding of Shape and Orientation of Objects Indented Into the Monkey Fingerpad by Populations of Slowly and Rapidly Adapting Mechanoreceptors—Partap S. Khalsa, Robert M. Friedman, Mandayam A. Srinivasan, Robert H. Lamotte, Journal of Neurophysiology, 3238-3251 http://jn.physiology.org/content/79/6/3238] [The roles and functions of cutaneous mechanoreceptors—Kenneth O. Johnson, DOI: 10.1016/S0959-4388(00)00234-8].

Another advantage of the convex surface, compared to a flat surface, regards the relation finger contact area/contact surface displacement. In humans, the perception of the force applied by the finger between 0 and 1.5 N is mainly driven by the modification of the contacting area of the finger pad. The convex surface provides a ratio contact surface relation finger contact area/contact surface displacement smaller than a flat surface as shown in FIG. 10.

Figure 10:
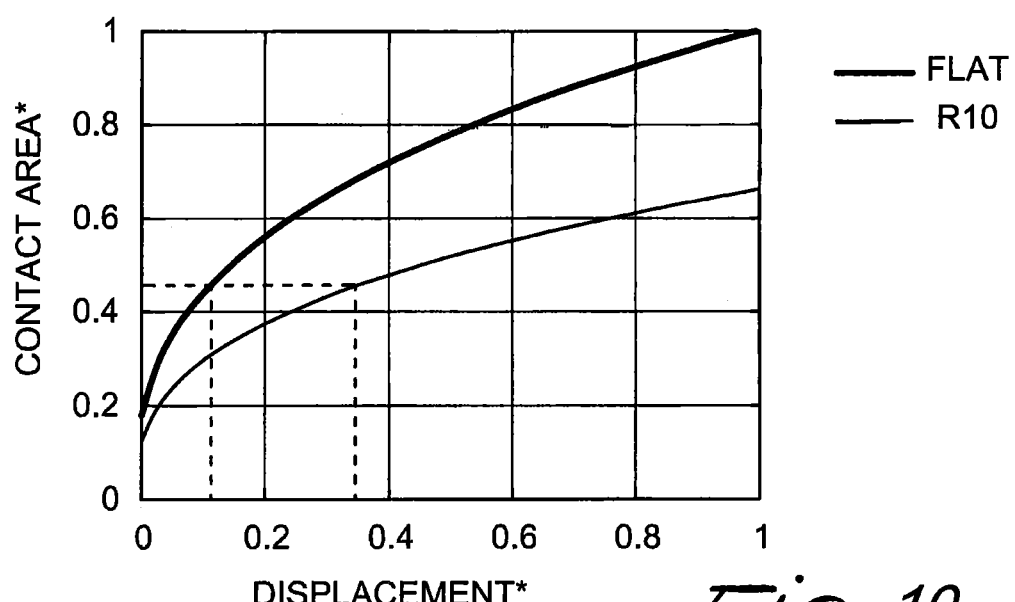
FIG. 10 shows normalized finger contact area/contact surface displacement relationship for flat and convex tactile interface.

FIG. 10 shows normalized finger contact area/contact surface displacement relationship for flat and convex tactile interface (R=10 mm).

This allows the implementation of a more refined control over the displacement of the contact surface regarding the contacting area [Tactual perception of material properties—Wouter M. Bergmann Tiest—doi:10.1016/j.visres.2010.10.005] [Haptic discrimination of softness in teleoperation: the role of the contact area spread rate—A. Bicchi; E. P. Scilingo; D. De Rossi—DOI: 10.1109/70.880800].

The device according to the invention is effectively simpler than the devices of the prior art, because it does not need complex and bulky systems to re-orient the contacting surface prior to the generation of the contact.

Also, the compactness of the present device increases the anthropomorphic shape of the device.

This strongly contributes to two different aspects.

The small and anthropomorphic shape allows the device to be transparent to the hand tracking systems based on image recognition. The device is not impeding on the hand tracking system to work and is not impairing its capability to track the hand.

The small and anthropomorphic shape allows a better feeling of the virtual object as real in virtual and augmented reality, inversely dependent of the dimension of the device.

Another advantage of the present invention is constituted by the capability to work with external systems for spatial hand tracking manufactured by third parties, which is due to the fact that the device is compact and the system for hand spatial position tracking recognizes the hand with the device being worn as if it were a bare hand.

Therefore, it is not necessary to modify the existing spatial tracking system.

Furthermore, this makes the device more versatile, since it can always benefit from the improvements of the spatial tracking system produced by third parties.

The materials used, as well as the dimensions, may of course be any according to the requirements and the state of the art.

This application claims the priority of Italian Patent Application No. UA2016A006954 (corresponding to 102016000097954), filed on Sep. 29, 2016, the subject matter of which is incorporated herein by reference.

The invention claimed is:

1. A haptic device for interaction with virtual reality or augmented reality systems, comprising:
    a fixed body configured to be worn on a finger of the hand, and a movable body associated with said fixed body and actuated by a motor means;
    a flap associated with said movable body and having a contact surface;
    said movable body being movable with respect to said fixed body so that said contact surface moves from a position that is spaced from said fingertip to a position of contact with fingertip;
    said device being wherein said contact surface of said flap is convex;
    wherein said motor means comprises an electric or piezoelectric motor that is mounted on said fixed body, said fixed body having a control circuit, a wireless data transmission module, an accelerometer, and a battery.

2. The device according to claim 1, wherein said fixed body is configured to be worn on a finger of the hand at the medial and distal phalanges.

3. The device according to claim 1, wherein said movable body can slide with respect to said fixed body and said motor means comprises an electric or piezoelectric linear motor which is mounted on said fixed body and acts directly on said movable body.

4. The device according to claim 3, wherein said movable body comprises a pair of longitudinal bars adapted to engage corresponding lateral guides formed in said fixed body;
    said movable body being provided with a cross member provided with a seat configured to accommodate a protrusion associated with a movable part of said linear motor;
    the movement of said protrusion causing said movable body to slide longitudinally with respect to said fixed body.

5. The device according to claim 1, wherein said movable body is hinged to said fixed body at a hinge and is actuated by a linkage;
    said linkage having two ends which are connected respectively to said movable body and to a crank that is connected to a shaft of rotary motor associated with said fixed body.

6. The device according to claim 1, wherein said accelerometer and said control circuit perform spatial tracking of said finger.

7. The device according to claim 1, further comprising an LED which is mounted on said fixed body to allow optical tracking of said finger.

8. A haptic device for interaction with virtual reality or augmented reality systems, comprising:
    a fixed body configured to be worn on a finger of the hand, and a movable body associated with said fixed body and actuated by a motor means;
    a flap associated with said movable body and having a contact surface;
    said movable body being movable with respect to said fixed body so that said contact surface moves from a position that is spaced from said fingertip to a position of contact with fingertip;
    said device being wherein said contact surface of said flap is convex;
    wherein said movable body can slide with respect to said fixed body and said motor means comprises an electric or piezoelectric linear motor which is mounted on said fixed body and acts directly on said movable body.

9. The device according to claim 8, wherein said fixed body is configured to be worn on a finger of the hand at the medial and distal phalanges.

10. The device according to claim 8, wherein said movable body comprises a pair of longitudinal bars adapted to engage corresponding lateral guides formed in said fixed body;
    said movable body being provided with a cross member provided with a seat configured to accommodate a protrusion associated with a movable part of said linear motor;
    the movement of said protrusion causing said movable body to slide longitudinally with respect to said fixed body.

11. The device according to claim 8, wherein said accelerometer and said control circuit perform spatial tracking of said finger.

12. The device according to claim 8, further comprising an LED that is mounted on said fixed body to allow optical tracking of said finger.

13. A haptic device for interaction with virtual reality or augmented reality systems, comprising:
    a fixed body configured to be worn on a finger of the hand, and a movable body associated with said fixed body and actuated by a motor means;
    a flap associated with said movable body and having a contact surface;

said movable body being movable with respect to said fixed body so that said contact surface moves from a position that is spaced from said fingertip to a position of contact with fingertip;

said device being wherein said contact surface of said flap is convex;

wherein said movable body comprises a pair of longitudinal bars adapted to engage corresponding lateral guides formed in said fixed body;

said movable body being provided with a cross member provided with a seat configured to accommodate a protrusion associated with a movable part of a linear motor;

the movement of said protrusion causing said movable body to slide longitudinally with respect to said fixed body.

14. The device according to claim 13, wherein said fixed body is configured to be worn on a finger of the hand at the medial and distal phalanges.

15. The device according to claim 13, wherein said accelerometer and said control circuit perform spatial tracking of said finger.

16. The device according to claim 13, further comprising an LED that is mounted on said fixed body to allow optical tracking of said finger.

* * * * *